United States Patent [19]

Tanaka

[11] Patent Number: 4,830,285
[45] Date of Patent: May 16, 1989

[54] FUEL INJECTION NOZZLE

[75] Inventor: Noritoshi Tanaka, Higashimatsuyama, Japan

[73] Assignee: Diesel Kiki Co., Ltd., Tokyo, Japan

[21] Appl. No.: 103,187

[22] Filed: Sep. 30, 1987

[30] Foreign Application Priority Data

Dec. 22, 1986 [JP] Japan .............. 61-196880[U]

[51] Int. Cl.$^4$ ............... F02M 61/16; F02M 61/20; B05B 1/30
[52] U.S. Cl. ............... 239/533.6; 239/533.9; 239/584
[58] Field of Search ............ 239/533.3–533.12, 239/584

[56] References Cited

U.S. PATENT DOCUMENTS

| | | | |
|---|---|---|---|
| 1,821,272 | 9/1931 | Petersen | 239/584 |
| 1,834,061 | 12/1931 | Joachim | 239/533.4 X |
| 3,255,974 | 6/1966 | Roosa | 239/533.6 |
| 3,373,943 | 3/1968 | Roosa | 239/533.6 |
| 3,434,667 | 3/1969 | Chmura | 239/533.11 |
| 3,627,207 | 12/1971 | Hohmuth | 239/533.6 |
| 3,747,857 | 7/1973 | Fenne | 239/533.5 X |
| 3,806,041 | 4/1974 | Tolan | 239/533.6 |
| 4,448,356 | 5/1984 | Nakajima et al. | 239/533.5 |

FOREIGN PATENT DOCUMENTS 994588 11/1951 France ................. 239/533.5
53-33042 8/1978 Japan .

Primary Examiner—Andres Kashnikow
Assistant Examiner—Patrick N. Burkhart
Attorney, Agent, or Firm—Frishauf, Holtz, Goodman & Woodward

[57] ABSTRACT

A fuel injection nozzle for use with a fuel injection pump comprises a tubular body and a valve needle slidably arranged within the body. First and second nozzle springs are arranged respectively within first and second spring chambers formed in the body. The first nozzle spring is interposed between a first stationary spring seat and a first movable spring seat for biasing the valve needle toward its closed position. The second nozzle spring is interposed between a second stationary spring seat and a second movable spring seat for biasing a push rod toward the valve needle. The push rod has a front end face spaced from a rear end face of the valve needle by an initial injection valve opening lifting gap. A main injection lift amount adjusting member has a front end face spaced from a rear end face of the push rod by a main injection valve opening lifting gap. The main injection lift amount adjusting member has at least a front end portion of a solid structure, and a rear end portion provided with a communication passage communicating the second spring chamber with a fuel overflow port formed at a rear end of the body.

4 Claims, 2 Drawing Sheets

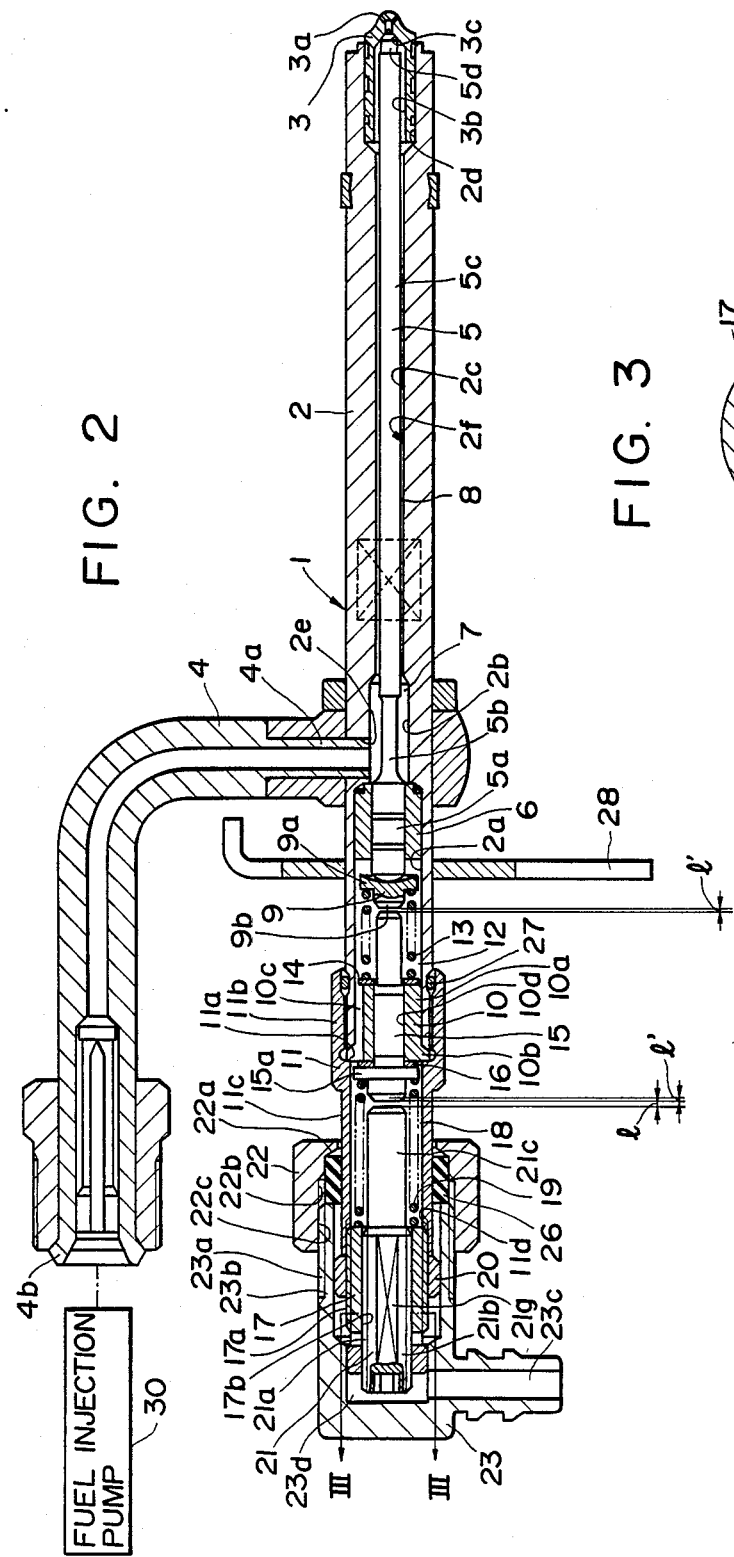
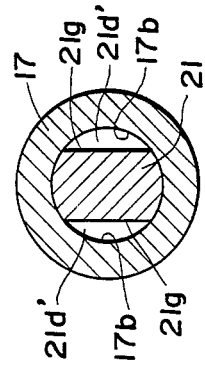

FUEL INJECTION NOZZLE

BACKGROUND OF THE INVENTION

The present invention relates to a fuel injection nozzle for use with a fuel injection pump for internal combustion engines, particularly for diesel engines.

In recent years, internal combustion engines have a tendency to be reduced in size, to increase in compression ratio and to increase in rotational speed. It is effective for the reduction in size to reduce the diameter of a fuel injection nozzle which is inserted into the cylinder head of the engine. In order to increase the compression ratio and to increase the rotational speed, it is strongly required to reduce the diameter of the fuel injection nozzle, particularly in the case where the nozzle is employed in an internal combustion engine of four valve type, because the nozzle-mounting space is small at the cylinder head.

Proposals have been made to meet the above requirement, as disclosed, for example, by Japanese Utility Model Publication (Kokoku) No. 53-33042, in which a fuel injection nozzle comprises a body formed with nozzle holes and a fuel inlet port for connection to a fuel injection pump, and a valve needle slidably fitted within the body for opening and closing the nozzle holes in response to the pressure of fuel delivered from the fuel injection pump into the interior of the body. The fuel inlet port communicates with the nozzle holes through a gap between the inner peripheral surface of the body and the outer peripheral surface of the valve needle. However, the conventional fuel injection nozzle is high in injection rate and short in injection period, because the valve needle is rapidly moved to open the nozzle holes at the time the pressure of fuel reaches a valve opening pressure. For this reason, in particular, when the fuel injection nozzle is applied to a diesel engine of direct-injection type, the combustion period is short, resulting in increased combustion noise. Further, irregular injection tends to occur, resulting in variation of combustion and in hunting in the engine rotation. Moreover, if a drain passage for discharging overflow fuel is provided in a wall of the body, the body is required to have its wall thickness increased. This increases the overall diameter of the fuel injection nozzle correspondingly. Thus, the provision of the drain passage in the wall of the body is an obstacle to the attempt to reduce the diameter of the fuel injection nozzle.

SUMMARY OF THE INVENTION

It is an object of the invention to provide a fuel injection nozzle which can reduce the combustion noise and the combustion variation and which can be made compact in size.

According to the invention, there is provided a fuel injection nozzle for use with a fuel injection pump, comprising:

a body in the form of an elongated tube having a peripheral wall thereof formed with a fuel inlet port at a predetermined position for connection to the fuel injection pump, the body having one end thereof formed with at least one nozzle hole, the body having a valve needle fitting bore and first and second spring chambers formed therein and arranged along a longitudinal axis thereof in a contiguous fashion;

a valve needle fitted within the valve needle fitting bore of the body for sliding movement between a closed position where the at least one nozzle hole is closed and an open position where the at least one nozzle hole is opened, a gap being left between an outer peripheral surface of the valve needle and a wall surface of the valve needle fitting bore, the gap communicating the at least one nozzle hole and the fuel inlet port with each other;

a first stationary spring seat located within the first spring chamber in the body;

a first movable spring seat arranged at one end of the valve needle for sliding movement therewith;

a first nozzle spring interposed between the first stationary spring seat and the first movable spring seat for biasing the valve needle toward the closed position;

a push rod slidably arranged within the first spring chamber in the body and having one end face opposed to one end face of the first movable spring seat, an initial injection valve opening lifting gap being defined between the one end face of the push rod and the one end face of the first movable spring seat when the valve needle is in the closed position;

a second stationary spring seat located within the second spring chamber in the body;

a second movable spring seat arranged at another end of the push rod for sliding movement therewith;

a second nozzle spring interposed between the second stationary spring seat and the second movable spring seat for biasing the push rod toward the valve needle;

a main injection lift amount adjusting member arranged within the second spring chamber in the body and having one end face opposed to one end face of the push rod, a main injection valve opening lifting gap being defined between the one end face of the main injection lift amount adjusting member and the one end face of the push rod when the valve needle is in the closed position;

fuel overflow port means provided at another end of the body and having a fuel overflow port formed therein; and a communication passage provided at at least part of the main injection lift amount adjusting member and communicating the second spring chamber and the fuel overflow port with each other.

Preferably, the main injection lift amount adjusting member has at least one end portion opposed to the one end face of the push rod, which is of a solid structure, the main injection amount adjusting member having another end portion provided with the communication passage.

The above and other objects, features and advantages of the invention will become more apparent from the ensuing detailed description taken in conjunction with the accompanying drawings.

BRIEF DESCRIPTION OF THE DRAWINGS

FIG. 2 is a view similar to FIG. 1, but showing a second embodiment of the invention; and FIG. 3 is a cross-sectional view taken along the line III—III in FIG. 2.

DETAILED DESCRIPTION

Figure 1:
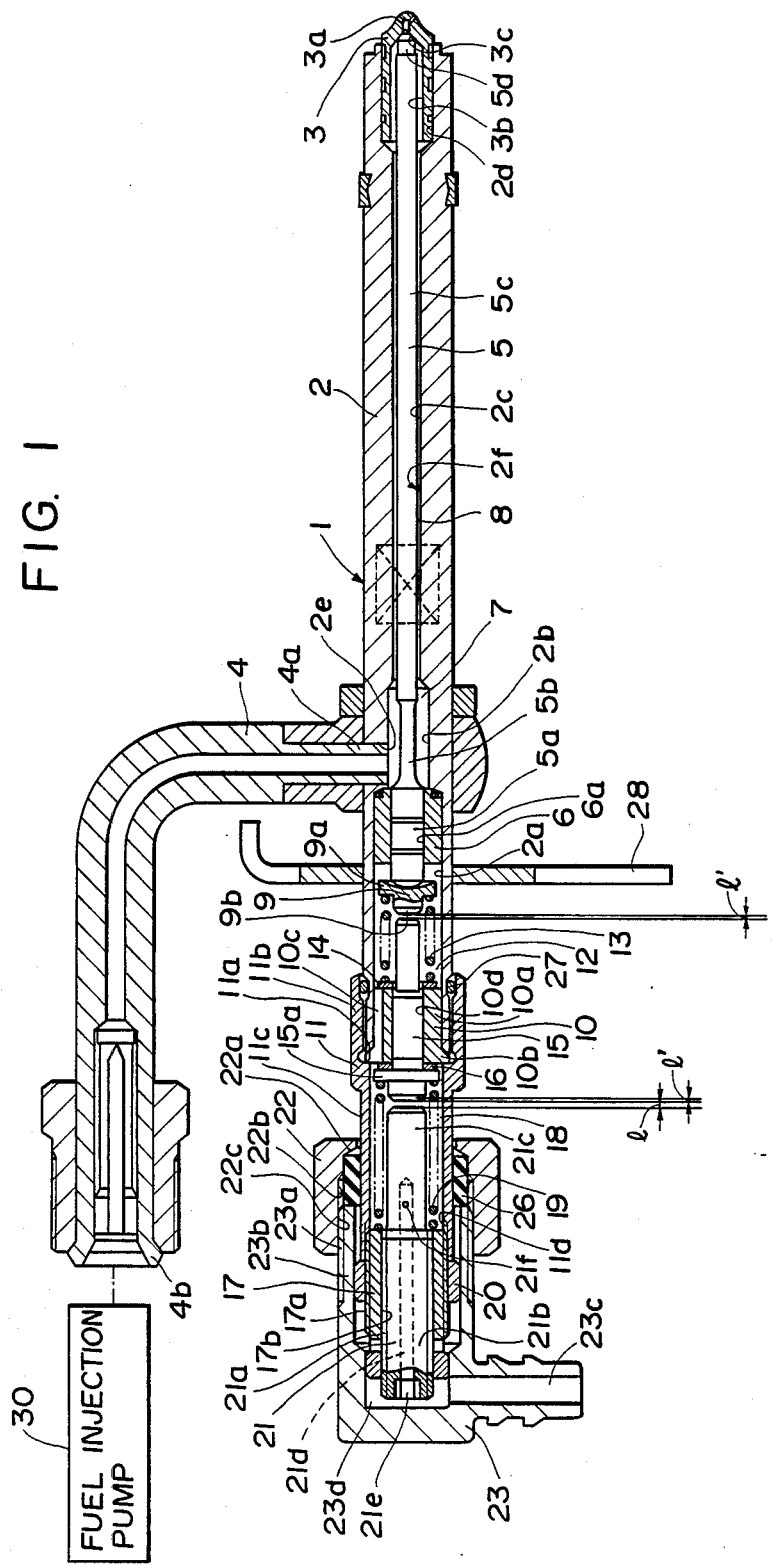
FIG. 1 is a longitudinal cross-sectional view showing a first embodiment of a fuel injection nozzle according to the invention.

Referring to FIG. 1, there is illustrated in longitudinal cross-section a fuel injection nozzle according to a first embodiment of the invention. The fuel injection nozzle comprises a body 1 in the form of an elongated tube having a diameter smaller than that of a conventional fuel injection nozzle. The body 1 is composed of a nozzle holder 2 and a guide sleeve 11 connected to a rear end of the nozzle holder 2. The nozzle holder 2 is formed therein with first to third fitting bore sections 2a, 2b and 2c successively reduced in diameter toward a front end or tip of the nozzle holder 2, and a fourth fitting bore section 2d larger in diameter than the third fitting bore 2c. These bore sections are arranged in a contiguous fashion and in coaxial relation to form a valve needle fitting bore 2f. A nozzle tip 3 formed at its front end with a plurality of nozzle holes 3a is rigidly fitted in the fourth fitting bore section 2d. The nozzle holder 2 has a peripheral wall formed with a fuel inlet port 2e opening into the second fitting bore section 2b. A communication pipe 4 has one end 4a connected to the fuel inlet port 2e. The communication pipe 4 is generally in the form of the letter L in side view and has a portion extending to the other end 4b in parallel relation to the nozzle holder 2. The other end 4b of the communication pipe 4 is connectable to a discharge port of a fuel injection pump 30.

A valve needle 5 is fitted within the nozzle holder 2 for sliding movement between an illustrated closed position where the nozzle holes 3a are closed and an open position where the nozzle holes 3a are opened. The valve needle 5 is composed of a head 5a, an intermediate portion 5b and a leg 5c, in the order from a read end of the valve needle 5. The head 5a of the valve needle 5 is slidably closely fitted through a bore 6a of a valve needle guide bush 6 which is rigidly fitted in a front end of the first fitting bore section 2a of the nozzle holder 2. The intermediate portion 5b of the valve needle 5 is fitted through the second bore section 2b of the nozzle holder 2 such that an annular pressure chamber 7 is defined between an outer peripheral surface of the intermediate portion 5b and a wall surface of the second fitting bore section 2b. The leg 5c of the valve needle 5 is smaller in diameter than the head 5a, but is larger in diameter than the intermediate portion 5b. The leg 5c has its rear end extending into the second fitting bore section 2b of the nozzle holder 2. The opposite front end portion of the leg 5c is fitted in a fitting bore 3b of the nozzle tip 3. The front end portion of the leg 5c has a free end formed into a valve body 5d which abuts against a valve seat 3c formed at an inner surface of the nozzle tip 3 when the valve needle 5 is in the closed position. A predetermined annular gap is left between an outer peripheral surface of the leg 5c of the valve needle 5 and a wall surface of the third fitting bore section 2c in the nozzle holder 2, to form an annular fuel supply passage 8 through which the pressure chamber 7 communicates with the nozzle holes 3a in the nozzle tip 3.

The head 5a of the valve needle 5 has a read end projecting rearwardly from the valve needle valve guide bush 6 and having a semispherical end face. The semispherical end face of the head 5a abuts against a front end face of a first movable spring seat 9 which is composed of a body 9b in the form of a stub pin and an annular flange 9a integrally projecting radially outwardly from an outer peripheral surface of the body 9b. The body 9b and the flange 9a have their respective front end faces hemispherically shaped and slightly larger in radius of curvature than the semispherical end face of the head 5a of the valve needle 5. A predetermined gap is left between an outer peripheral surface of the flange 9a and a wall surface of the first fitting bore section 2a in the nozzle holder 2.

An intermediate bush 10 is rigidly fitted in a rear end of the first fitting bore section 2a of the nozzle holder 2. The intermediate bush 10 is comprised of a body 10a and an annular flange 10b extending radially outwardly from a rear end of the body 10a. The guide sleeve 11 is composed of a larger diameter portion 11b and a smaller diameter portion 11c. The larger diameter portion 11b has an inner peripheral surface threadedly engaged with the outer peripheral surface of the rear end portion of the nozzle holder 2, to fix the intermediate bush 10 in position with respect to the nozzle holder 2 in such a manner that an outer peripheral surface of the body 10a of the intermediate bush 10 abuts against the wall surface of the first fitting bore section 2a, a front end face of the flange 10b abuts against the rear end face of the nozzle holder 2, and a stepped portion 11a of the guide sleeve 11 abuts against a rear end face of the flange 10b. An O-ring 27 is interposed between an inner peripheral surface of a front end of the guide sleeve 11 and the outer peripheral surface of the nozzle holder 2 to liquidtightly seal between them. The front end face of the intermediate bush 10 within the first fitting bore section 2a serves a a first stationary spring seat. A first nozzle spring chamber 12 is defined between a front end face of the intermediate bush 10 and the opposed end face of the flange 9a of the first movable spring seat 9. A first coiled nozzle spring 13 is disposed within the first nozzle spring chamber 12, to bias the first movable spring seat 9 toward the valve needle 5 (to the right as viewed in FIG. 1). A first valve opening pressure (initial injection valve opening pressure) adjusting shim 14 having a predetermined thickness for varying the biasing force of the first nozzle spring 13 is interposed between the front end face of the intermediate bush 10 and a rear end of the first nozzle spring 13.

A push rod 15 is slidably fitted through a central bore 10d of the intermediate bush 10. The push rod 15 has its front end extending into the first nozzle spring chamber 12. The front end of the push rod 15 has an end face spaced from the opposed rear end face of the body 9b of the first movable spring seat 9 by a predetermined distance, i.e., an initial injection valve opening lifting gap 1' when the valve needle 5 is in the closed position. A rear end of the push rod 15 projects rearwardly from the rear end face of the intermediate bush 10, and is located within the smaller diameter portion 11c of the guide sleeve 11. An annular flange-like second movable spring seat 15a projects, in an integral manner, radially outwardly from the outer peripheral surface of the rear end of the push rod 15. The second movable spring seat 15a has its front end face abutting against the rear end face of the intermediate bush 10, to thereby determine the extreme forward position of the push rod 15. A pre-lift adjusting shim 16 having a predetermined thickness for adjusting an amount of pre-lift (initial injection valve opening lift) is interposed between the front end face of the second movable spring seat 15a and the rear end face of the intermediate bush 10.

The guide sleeve 11 has female threads 11d formed on the inner peripheral surface of the rear end of the smaller diameter portion 11c. A second valve opening pressure (main injection valve opening pressure) adjusting screw member 17 is threadedly engaged with the female threads 11d. The second valve opening pressure adjusting screw member 17 is tubular in shape, and has male threads 17a and female threads 17b formed respectively on the outer and inner peripheral surfaces of the screw member 17 in such a manner that the threads 17a and 17b extend over the entire axial length of the screw member 17. A front end face of the second valve opening pressure adjusting screw member 17 serves as a second stationary spring seat. A second nozzle spring chamber 18 is defined between the front end face of the second valve opening pressure adjusting screw member 17 and the opposed end face of the second movable spring seat 15a. A second nozzle spring 19 is disposed within the second nozzle spring chamber 18, to bias the second movable spring seat 15a toward its valve closing position or to the right as viewed in FIG. 1. The second nozzle spring chamber 18 communicates with the first nozzle spring chamber 12 through a fuel overflow port 10c axially formed in the outer peripheral surface of the intermediate bush 10. The second valve opening pressure adjusting screw member 17 is fixed in position relative to the guide sleeve 11 by a lock nut 20 which is threadedly engaged with the male threads 17a.

A main lift (main injection valve opening lift) adjusting screw member or main injection lift amount adjusting member 21 is threadedly engaged with the inner peripheral surface of the second valve opening pressure adjusting screw member 17. The main lift adjusting screw member 21 is composed of a larger diameter portion 21b and a smaller diameter portion 21c, the former extending from an axial middle of the screw member 21 to its rear end and the latter extending from the axial middle to the front end. Male threads 21a are formed on an outer peripheral surface of the large diameter portion 21b. The smaller diameter portion 21c projects into the second nozzle spring chamber 18. A front end face of the smaller diameter portion 21c is spaced from the opposed rear end face of the push rod 15 by a predetermined distance or a main injection valve opening lifting gap 1 when the second movable spring seat 15a is in an extreme position in the valve closing direction or the rightward direction as viewed in FIG. 1. In the main lift adjusting screw member 21, the smaller diameter portion 21c has a solid section extending from an axial middle of the portion 21c to its front end, and a communication bore 21d is concentrically formed and axially extends from the axial middle of the smaller diameter portion 21c to the rear end face of the larger diameter portion 21b. The communication bore 21d has a rear end serving as a drain port 21e. A radial communication port 21f is formed through the peripheral wall of the smaller diameter portion 21c and opens into the communication bore 21d. The communication bore 21d and the communication port 21f form a communication passage for overflow fuel in the illustrated embodiment. The communication bore 21d communicates with the second nozzle spring chamber 18 through the communication port 21f.

A fixing member 22 is fitted about a section of the outer peripheral surface of the smaller diameter portion 11c of the guide sleeve 11, which section extends from an axial middle of the smaller diameter portion 11c to its rear end. The fixing member 22 is in the form of a cylindrical stub, and a bore in the fixing member 22 is composed of a larger diameter portion 22b adjacent a rear end of the fixing member 22, a smaller diameter portion adjacent a front end of the fixing member 22, and a tapered portion 22a extending between them. The larger diameter portion 22b is formed with female threads 22c. A fuel overflow nipple 23 has male threads 23a formed thereon and threadedly engaged with the female threads 22c. The fuel overflow nipple 23 is composed of a tubular body 23b having an axially open end, and a connector portion formed therein with a fuel overflow port 23c extending radially outwardly from an outer peripheral surface of an opposite closed end of the body 23b. The aforesaid male threads 23a are formed on an outer peripheral surface of the open end of the body 23b.

The body 23b of the fuel overflow nipple 23 is disposed to enclose the rear end of the guide sleeve 11, the second valve opening pressure adjusting member 17 and the drain port 21e of the main lift adjusting screw member 21, with gaps left between the body 23b and these component parts. A part of the gap forms a bore 23d in the body 23b. A packing 26 formed of rubber is interposed between the outer peripheral surface of the guide sleeve 11, the inner peripheral surface of the fixing member 22 and the front end face of the fuel overflow nipple 23, to liquid-tightly seal therebetween.

The fuel overflow port 23c in the fuel overflow nipple 23 has one end communicating with the drain port 21e in the main lift adjusting screw member 21 through the bore 23d in the body 23b. The other end of the fuel overflow port 23c is to be connected to a fuel tank, not shown.

Reference numeral 28 in FIG. 1 designates a mounting plate for mounting the fuel injection nozzle to the engine.

The operation of the fuel injection nozzle constructed as described above will be described below.

When the fuel injection pump 30 is not operated, the fuel injection nozzle 1 is in the position illustrated in FIG. 1. That is, when the fuel injection pump 30 is not operated and no pressurized fuel is delivered to the fuel injection nozzle, the first movable spring seat 9 and the second movable spring seat 15a are biased in the valve closing direction respectively by the biasing force of the first nozzle spring 13 and the biasing force of the second nozzle spring 19. Accordingly, the initial injection valve opening lift gap 1' is maintained between the rear end face of the body 9b of the first movable spring seat 9 and the front end face of the push rod 15, and the main injection valve opening lift gap 1 is maintained between the rear end face of the push rod 15 and the front end face of the smaller diameter portion 21c of the main lift adjusting screw member 21. The valve needle 5 is biased in the valve closing direction by the biasing force of the first nozzle spring 13 through the first movable spring seat 9, so that the valve needle 5 is in the closed position where the valve body 5d is seated on the valve seat 3c of the nozzle tip 3.

With the fuel injection nozzle 1 in the position described above, as the fuel injection pump 30 is operated to increase the delivery pressure, pressurized fuel is delivered to the pressure chamber 7 through the communication pipe 4 and the fuel inlet port 2e. As the fuel pressure increases and overcomes the biasing force of the first nozzle spring 13, the valve needle 5 is moved against the biasing force of the first nozzle spring 13 until the rear end face of the body 9b of the first movable spring seat 9 abuts against the front end face of the push rod 15, that is, by the initial injection valve opening lift 1'. Thus, the valve body 5d of the valve needle 5 is moved away from the valve seat 3c of the nozzle tip 3, into the open position where the fuel supplied from the pressure chamber 7 through the fuel supply passage 8 and the fitting bore 3b in the nozzle tip 3 is injected through the nozzle holes 3a. That is, the fuel injection nozzle 1 is in the initial injection position. As the fuel pressure further increases from this initial injection position and overcomes the sum of the biasing forces of the first and second nozzle springs 13 and 19, the valve needle 5 is further moved together with the push rod 15 against the sum of the biasing forces until the rear end face of the push rod 15 abuts against the front end face of the smaller diameter portion 21c of the main lift adjusting screw member 21, that is, by the main injection valve opening lifting gap 1, so that the fuel is injected through the nozzle holes 3a. Thus, the fuel injection nozzle is in the main injection position.

As described above, during the initial stage of the injection, only the first nozzle spring 13 is acted upon by the fuel pressure to reduce the valve opening pressure so that the initial injection is effected at a low injection rate through a limited lift amount determined by the initial injection valve opening lifting gap 1. Following the initial stage, both the first and second nozzle springs 13 and 19 are acted upon by the fuel pressure to increase the valve opening pressure so that the fuel injection is effected at a high injection rate through a lift amount determined by the sum 1+1' of the initial injection valve opening lifting gap 1'and the main injection valve opening lifting gap 1. In this manner, it is possible to obtain a desirable amount of injection, and to reduce the combustion noise. Moreover, the valve opening pressure and lift amount during the initial injection are set respectively by adjusting the thickness of the first valve opening pressure adjusting shim 14 and by adjusting the thickness of the pre-lift adjusting shim 16. The valve opening pressure and lift amount during the main injection are set respectively by adjusting the distance through which the second valve opening pressure adjusting screw member 17 is screwed into the guide sleeve 11, and by adjusting the distance through which the main lift adjusting screw member 21 is screwed into the screw member 17. Thus, these settings can be effected easily and independently of each other.

Depending upon the differential pressure across the head 5a of the valve needle 5, part of the fuel within the pressure chamber 7 flows, as overflow fuel, into the first nozzle spring chamber 12 through a gap between the outer peripheral surface of the head 5a and the inner peripheral surface of the valve needle guide bush 6. Major part of the overflow fuel flows into the second nozzle spring chamber 18 through the fuel overflow port 10c of the intermediate bush 10, and minor part of the overflow fuel flows into the second nozzle spring chamber 18 through a gap between the outer peripheral surface of the push rod 15 and the inner peripheral surface of the intermediate bush 10. The overflow fuel is returned from the second nozzle spring chamber 18 to the fuel tank through the communication port 21f, the communication bore 21d and the drain port 21e of the main lift adjusting screw member 21, and the bore 23d and the fuel overflow port 23c of the fuel overflow nipple 23 in the mentioned order.

As described above, since the communication passage communicating the first nozzle spring chamber 18 and the fuel overflow port 23c with each other, which communication passage is composed of the communication bore 21d and the communication port 21f, is provided in the main lift adjusting screw member 21, it is not required to increase the wall thickness of the body 1, unlike the case where the communication passage is provided in the peripheral wall of the body 1 as in a conventional fuel injection nozzle. This makes it possible to reduce the diameter of the portion of the body 1 that extends from the pressure chamber 7 to the rear end of the body 1. In addition, the fuel supply passage 8 communicating with the nozzle holes 3a of the nozzle tip 3 is constituted by the gap between the outer peripheral surface of the valve needle 5 and the inner peripheral surface of the nozzle holder 2, to thereby reduce the diameter of the nozzle holder 2. Thus, the fuel injection nozzle can be reduced in its overall diameter. Furthermore, in the illustrated embodiment, the connector portion formed with the fuel overflow port 23c of the fuel overflow nipple 23 extends perpendicularly to the axis of the body 1, and the body 23b of the fuel overflow nipple 23 is threadedly engaged with the fixing member 22, with the body 23 abutting against the packing 26 formed of rubber which is a flexible material tending to be deformed, so that it is possible to easily adjust the distance through which the fuel overflow nipple 23 is screwed into the fixing member 22. This makes it possible to set the orientation of the fuel overflow port 23c to an optional angular position in the circumferential direction of the body 1. Moreover, since the front end section of the smaller diameter portion 21c of the main lift adjusting screw member 21, against which the rear end face of the push rod 15 abuts during the main injection, is of a solid structure, it is possible to secure strength enough to withstand collision of the push rod 15 against the portion 21c, so that the main lift adjusting screw member 21 is rarely damaged.

As the delivery pressure from the fuel injection pump 30 decreases and the fuel pressure supplied to the fuel injection nozzle decreases correspondingly, the valve needle 5 and the first movable spring seat 9 are returned to their respective illustrated initial positions by the biasing force of the first nozzle spring 13, and the second movable spring seat 15a is returned to its illustrated position by the second nozzle spring 19. Thus, the valve needle 5 is returned to the closed position, so that the fuel injection is completed. The above-described operation is repeated in response to the fuel pressure from the fuel injection pump 30 so that the fuel injection is effected repeatedly.

Each time the fuel injection is effected, the valve needle 5 is reciprocated within the nozzle holder 2. During the reciprocative motion, the first movable spring seat 9, against which the head 5a of the valve needle 5 abuts, can be displaced radially under a radially acting force or the like. As described above, however, since the front end face of the first movable spring seat 9 and the rear end face of the head 5a of the valve needle 5, which abut against each other, are shaped semispherically, the radial force acting on the first movable spring seat 9 is not transmitted to the valve needle 5. Further, the head 5a of the valve needle 5 is closely fitted in the valve needle guide bush 6. Accordingly, if the first movable spring seat 9 moves radially, the valve needle 5 is automatically adjusted in position regardless of the radial movement of the spring seat 9, such that the axis of the valve needle 5 is kept in alignment with the axis of the nozzle holder 2. Thus, the valve needle 5 can smoothly be reciprocated without the outer peripheral surface of the valve needle 5 being caught on the inner peripheral surface of the nozzle holder 2.

FIGS. 2 and 3 illustrate a second embodiment of the invention. In FIGS. 2 and 3, like or similar reference numerals are used to designate parts and components like or similar to those of the first embodiment described previously. The second embodiment is different from the first embodiment only in the construction of a main lift adjusting screw member 21. Specifically, in place of the communication bore 21d and the communication port 21f forming the communication passage for the overflow fuel in the first embodiment, the main lift adjusting screw member 21 in the second embodiment has a pair of parallel chamfered portions 21g which are formed on the outer peripheral surface of the screw member 21 and which axially extend over the entire length thereof. The chamfered portions 21g cooperate with the female threads 17b on the inner peripheral surface of the second valve opening pressure adjusting screw member 17, to define therebetween communication bores 21d' as clearly seen from FIG. 3. The communication bores 21d' communicate the second nozzle spring chamber 18 and the bore 23d within the fuel overflow nipple 23 with each other, so that the communication bores 21d' serve as the communication passage for the overflow fuel.

With the construction described above, overflow fuel flowing into the second nozzle spring chamber 18 is returned to the fuel tank through the communication bores 21d', and the bore 23d and the fuel overflow port 23c of the fuel overflow nipple 23 in the mentioned order. In order to provide the communication passage for the overflow fuel, it is sufficient in the second embodiment to cut or machine the outer peripheral surface of the main lift adjusting screw member 21. Such machining is easier than the case of the first embodiment where the axial communication bore 21d and the radial communication port 21f are drilled in the main lift adjusting screw member 21. Other construction and operation of the second embodiment are similar to those of the first embodiment.

As described above in detail, according to the invention, the injection can be effected at low injection pressure and in a small injection amount during the initial stage of the injection and, subsequent to the initial stage, the main injection can be effected at high injection pressure and in a large injection amount. This dual stage injection is effected over an eventually prolonged time period, making it possible to considerably reduce the combustion noise, particularly in the low injection amount range, and to stabilize the combustion. Further, since the front end portion of the main injection lift amount adjusting member is of a solid structure, enough strength to withstand collision of the push rod against the adjusting member is secured so that the main injection lift amount adjusting member is rarely damaged. Moreover, since the communication passage communicating the spring chamber and the fuel overflow port with each other is provided in the rear end portion of the main injection lift amount adjusting member, the wall thickness of the body can be reduced as compared with the conventional case where the communication passage is provided in the peripheral wall of the body. In addition, the fuel supply passage is formed between the outer periphery surface of the needle valve and the inner peripheral surface of the body. Thus, it is possible to reduce the overall diameter of the fuel injection nozzle.

What is claimed is:

1. A fuel injection nozzle for use with a fuel injection pump, comprising:
   a body in the form of an elongated tube having a peripheral wall formed with a fuel inlet port at a predetermined position for connection to a fuel injection pump, said body having one end formed with at least one nozzle hole, and having a valve needle fitting bore, a first spring chamber and a second spring chamber formed therein and arranged along a longitudinal axis of the body in a contiguous fashion;
   a valve needle fitted within said valve needle fitting bore of said body, for sliding movement between a closed position where said at least one nozzle hole is closed and an open position where said at least one nozzle hole is opened, wherein a gap is left between an outer peripheral surface of said valve needle and a wall surface of said valve needle fitting bore, said gap communicating said at least one nozzle hole and said fuel inlet port with each other;
   a first stationary spring seat located within said first spring chamber in said body;
   a first movable spring seat arranged at one end face of said valve needle for axial sliding movement therewith;
   a first nozzle spring interposed between said first stationary spring seat and said first movable spring seat for biasing said valve needle toward said closed position;
   a push rod slidably arranged within said first spring chamber in said body and having a first end face opposed to a first end face of said first movable spring seat, an initial injection valve opening lifting gap being defined between said first end face of said push rod and said first end face of said first movable spring seat when said valve needle is in said closed position;
   a second stationary spring seat located within said second spring chamber in said body;
   a second movable spring seat arranged at a second end face of said push rod for sliding movement therewith;
   a second nozzle spring interposed between said second stationary spring seat and said second movable spring seat for biasing said push rod toward said valve needle;
   a main injection lift amount adjusting member arranged within said second spring chamber in said body and having one end face opposed to the second end face of said push rod, a main injection valve opening lifting gap being defined between said one end face of said main injection lift amount adjusting member and said second end face of said push rod when said valve needle is in said closed position;
   fuel overflow port means provided at another end of said body and having a fuel overflow port formed therein;
   a communication passage provided at at least part of said main injection lift amount adjusting member and communicating said second spring chamber and said fuel overflow port with each other;
   a fuel overflow nipple fitted about an outer peripheral surface of said another end of said body to enclose another end of said main injection lift amount adjusting member, said fuel overflow port means being provided on said fuel overflow nipple so that said fuel overflow port is directed perpendicularly to the longitudinal axis of said body;
   a cylindrical fixing member arranged about the outer peripheral surface of said another end of said body and having an inner peripheral surface threadedly engaged with one end of said fuel overflow nipple to fix the latter in position; and an annular flexible seal member disposed between the inner peripheral surface of said cylindrical fixing member and the outer peripheral surface of said another end of said body, said fuel overflow nipple having one end face abutting against said annular flexible seal member.

2. A fuel injection nozzle according to claim 1, wherein said main injection lift amount adjusting member has at least one end portion opposed to said first end face of said push rod, which is of a solid structure, said main injection lift amount adjusting member having another end portion provided with said communication passage.

3. A fuel injection nozzle according to claim 1, wherein said one communication passage comprises an axial communication bore and a radial communication port connected thereto, said axial communication bore and said radial communication port being formed in an end portion of said main injection lift amount adjusting member remote from said push rod.

4. A fuel injection nozzle according to claim 1, wherein said communication passage is formed by at least one chamfered portion provided on an outer peripheral surface of said main injection lift amount adjusting member and extending axially thereof.

* * * * *